Nov. 2, 1948.　　　　　F. KRAKE　　　　　2,452,937
BOAT-CARRYING TRAILER AND THE LIKE
Filed Jan. 19, 1946　　　　　　　　　　　　5 Sheets-Sheet 1
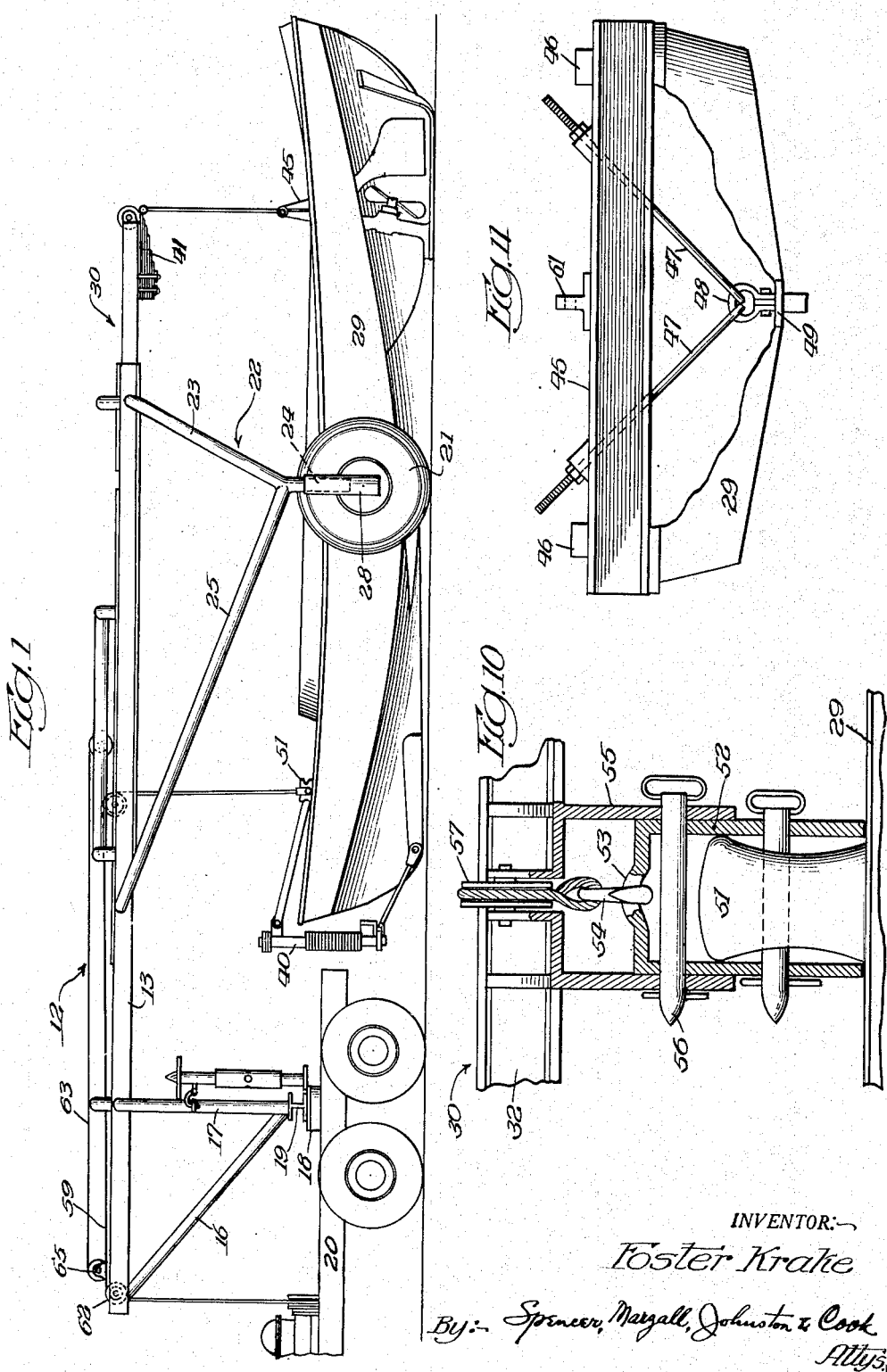
INVENTOR:
Foster Krake
By: Spencer, Margall, Johnston & Cook
Attys.

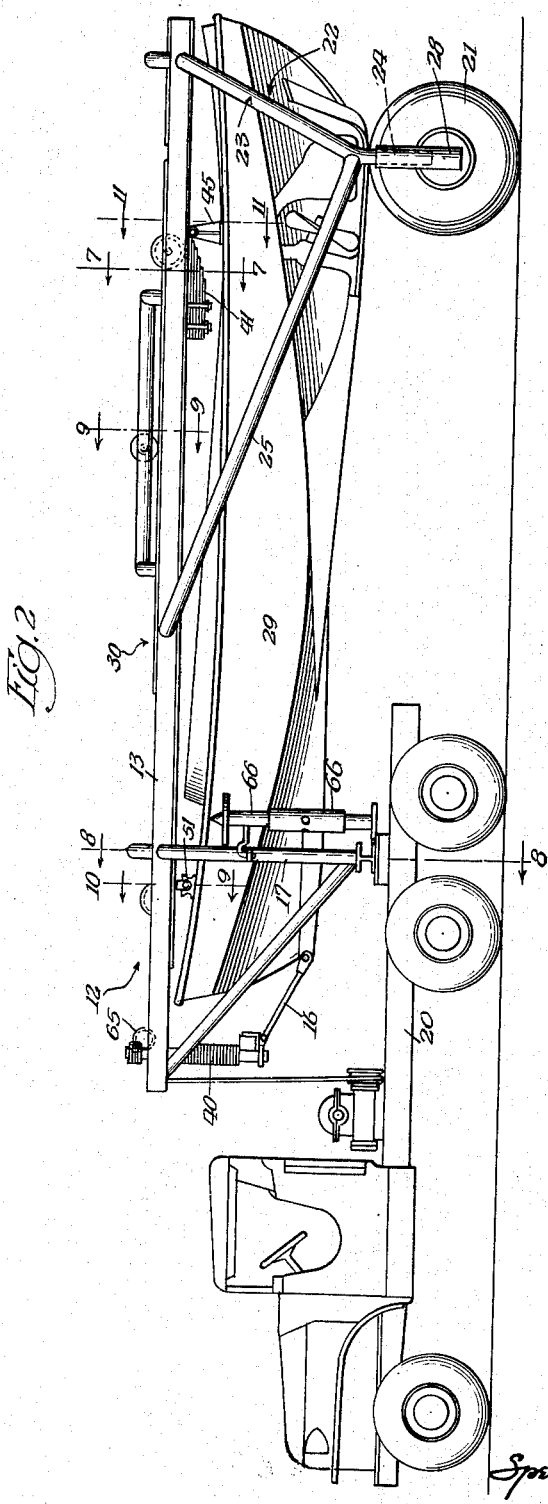

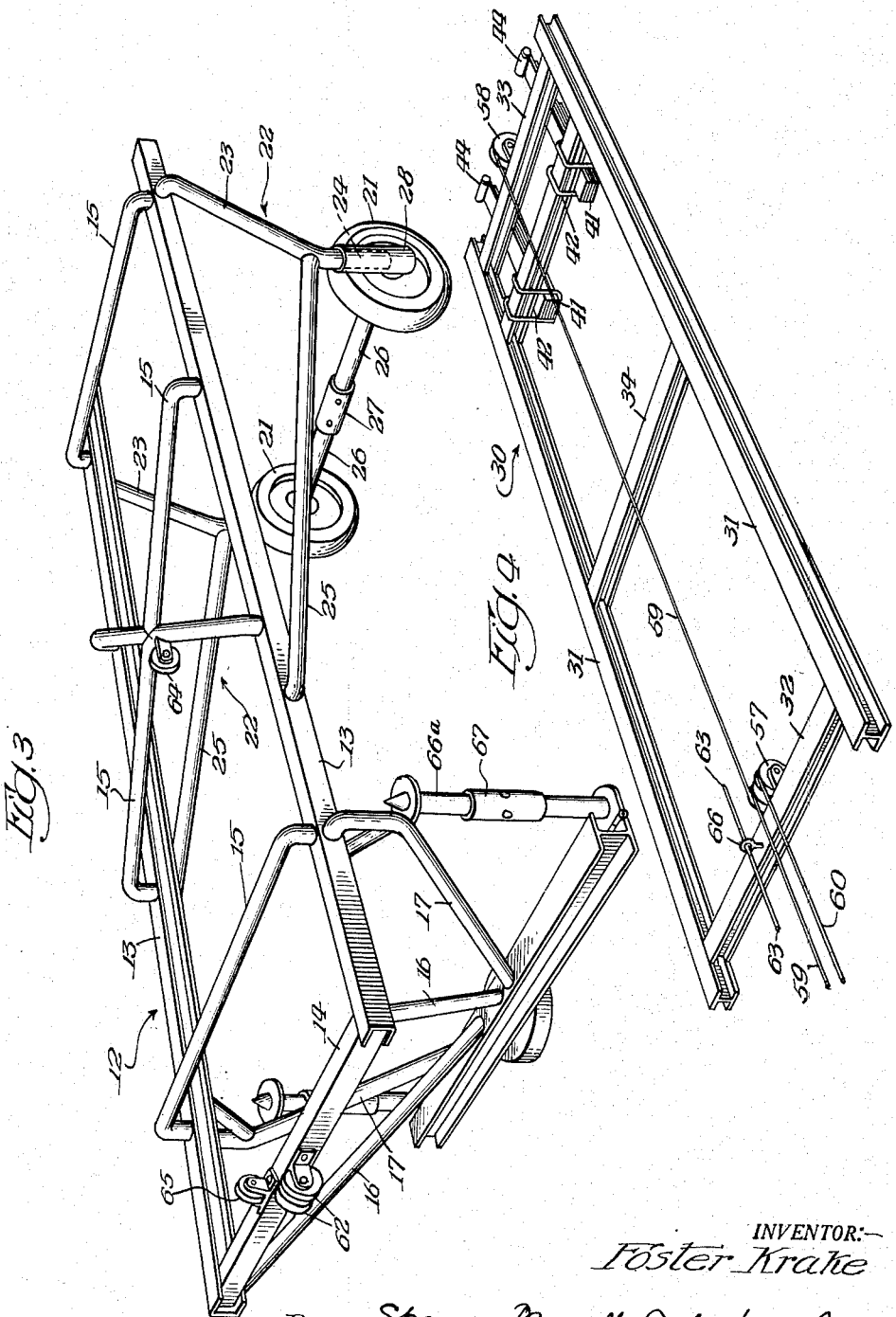

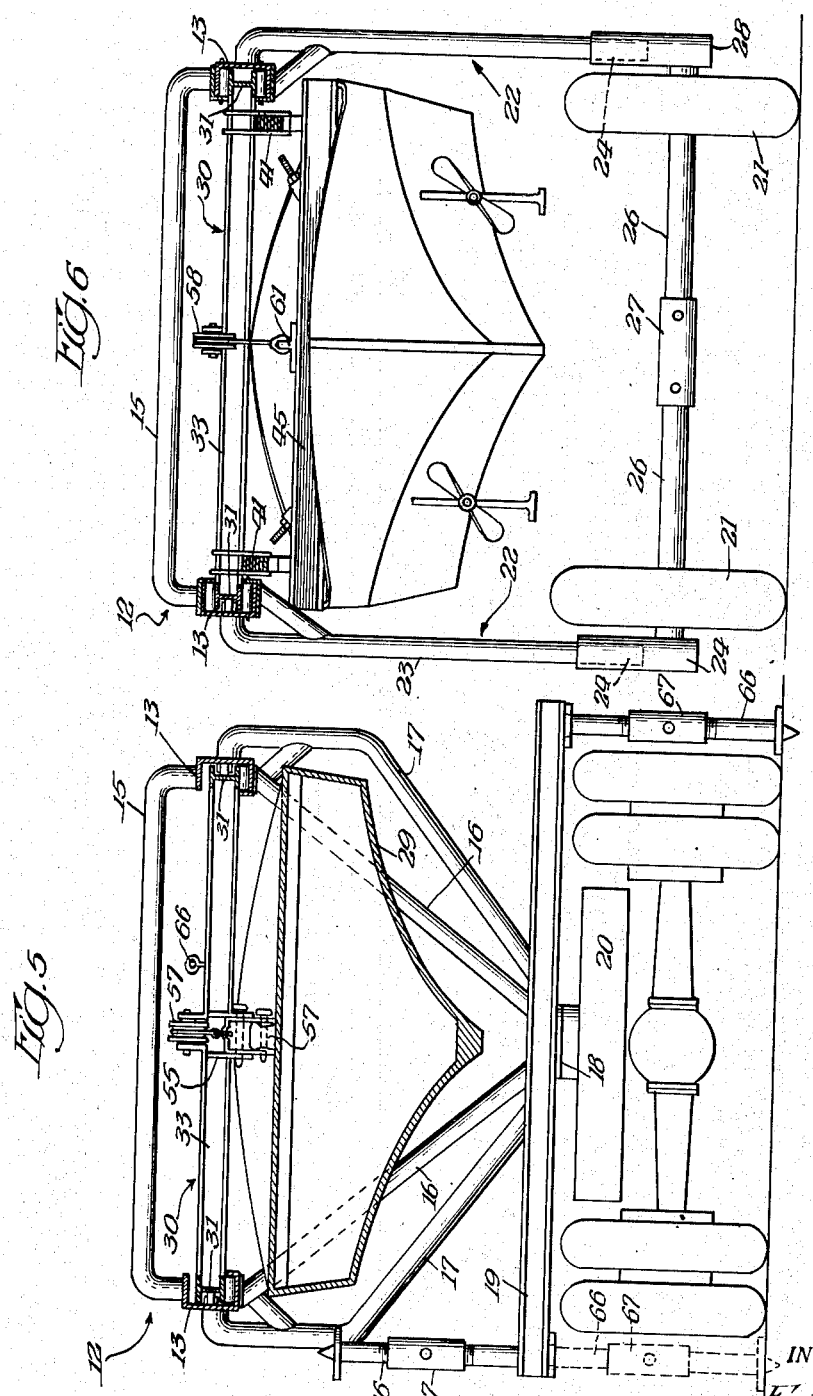

Nov. 2, 1948.                F. KRAKE                2,452,937
                   BOAT-CARRYING TRAILER AND THE LIKE
Filed Jan. 19, 1946                               5 Sheets-Sheet 5
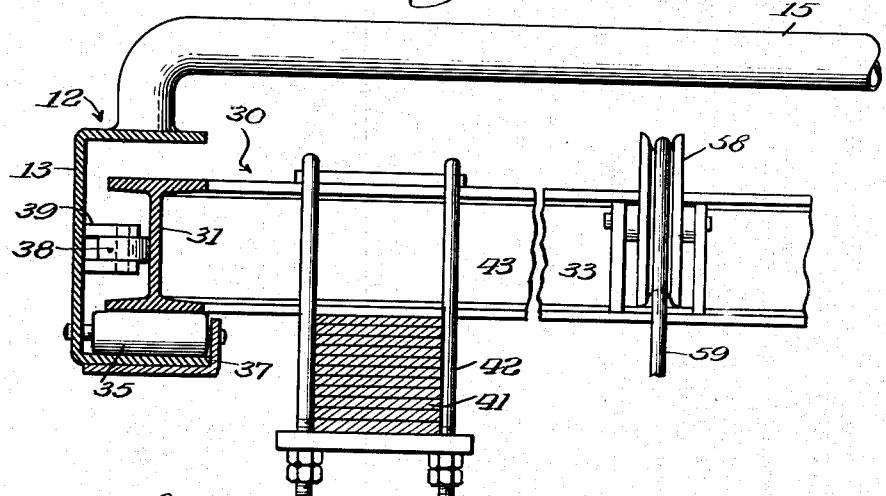
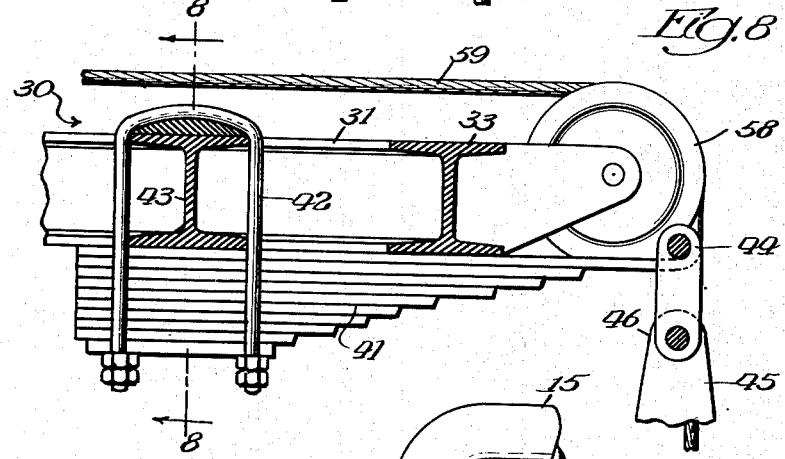
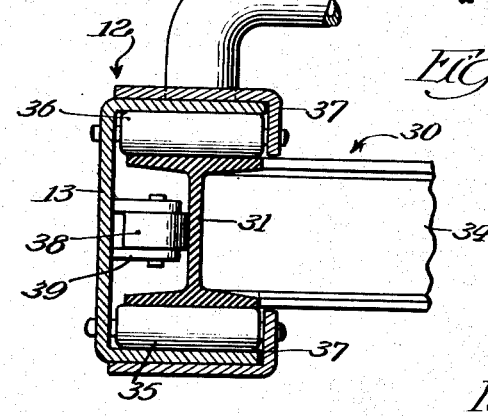
INVENTOR:
Foster Krake
By: Spencer, Marzall, Johnston & Cook
                              attys Patented Nov. 2, 1948

2,452,937

UNITED STATES PATENT OFFICE 2,452,937

BOAT-CARRYING TRAILER AND THE LIKE

Foster Krake, Coloma, Mich., assignor to Sporting Specialties Company, Coloma, Mich., a corporation of Michigan Application January 19, 1946, Serial No. 642,225

10 Claims. (Cl. 214—65)

The present invention relates in general to carriers, and has more particular reference to a trailer device for the transportation of boats and other objects, the invention having specific application to a carrier device adapted to be drawn overland by a suitable tractor, such as a truck having a fifth wheel.

An important object of the invention is to provide a trailer for an object, such as a boat, of appreciable size, wherein the object to be transported may be quickly and easily mounted in the trailer in suspended position; and the trailer may be easily attached to a tractor; a further object being to provide an inexpensive and relatively light weight, yet strong and rugged, trailer construction that can be manufactured at relatively low cost as by utilizing structural elements comprising hollow pipe stock.

Another important object is to provide a trailer having a suspension frame that can be projected longitudinally of the trailer structure, to loading and unloading position, and can also be retracted to carrying position on the trailer.

Another important object is to provide a trailer comprising a wheeled frame adapted for connection with a tractor and having a suspension frame shiftable on the trailer frame between a loading position in which the carrier frame is projected into position clearing the tractor, to which the trailer is attached, and a carrying position in which the carrying frame overlies the trailer connected end of the tractor, whereby a boat or other object being transported may be carried in position at least partially overlying the tractor in order to reduce the over-all length of the tractor and its load.

Another important object resides in forming the shiftable carrying frame of structural elements including I-beams, and to provide for slidingly mounting the carrier frame in ways formed in the wheeled trailer frame; a further object being to provide novel roller supports, in the wheeled trailer frame, for the shiftable carrying frame.

Another important object is to provide novel transverse bracing means for the wheeled trailer frame in which the carrying frame is shiftably mounted.

Another important object resides in providing power multiplying mechanism for projecting and retracting the carrier frame on the wheeled trailer frame.

Another important object resides in providing improved suspension means for supporting a boat or other object to be carried in the trailer.

The foregoing and numerous other important objects, advantages, and inherent functions of the invention will become apparent as the same is more fully understood from the following description which, taken in connection with the accompanying drawings, discloses a preferred embodiment of the invention.

Referring to the drawings:

Fig. 1 is a side elevation view of a trailer embodying the present invention shown in extended loading and unloading position;

Fig. 2 is a side elevation view of the trailer showing the same in relatively closed traveling position;

Fig. 3 is a perspective view of a wheeled frame forming a part of the trailer;

Fig. 4 is a perspective view of a shiftable subframe forming a part of the trailer assembly;

Fig. 5 is a vertical sectional view taken through the trailer and boat, adjacent the prow of the boat;

Fig. 6 is a vertical sectional view taken through the trailer and boat, in advance of the stern of the boat;

Fig. 7 is an enlarged sectional view taken substantially along the line 7—7 in Fig. 2;

Fig. 8 is a sectional view taken substantially along the line 8—8 in Fig. 7; and Figs. 9, 10 and 11 are enlarged sectional views taken substantially along the lines 9—9, 10—10, and 11—11 in Fig. 2.

As shown in the drawings, the trailer may embody a main frame 12 comprising a pair of spaced-apart longitudinally extending members 13, preferably of generally channel shaped configuration, disposed at the opposite sides of the trailer frame. At the front end of the trailer the members 13 are connected together and maintained in spaced relationship by a transverse beam 14; and the members 13 are maintained in braced and spaced relationship rearwardly of the transverse member 14 in any suitable fashion, as by preferably tubular bracing and spacing members 15 positioned to leave unobstructed the space between the members 13. To this end, the members 15 preferably extend above the zone between the members 13 and have downwardly offset ends which are welded or otherwise secured rigidly to the members 13 in order to maintain the same rigidly in spaced-apart position. At the forward end of the trailer the same is provided with dependent legs, including a pair of inclined legs 16 extending downwardly in an inwardly and rearwardly direction from the forward ends of the members 13, and a pair of legs 17 which extend downwardly and inwardly from the members 13 at a distance from the forward ends of said members. The legs 16 and 17 converge upon and are secured to a fifth wheel member 18. To this end, the legs 16 and 17 may be welded or otherwise rigidly secured to a transverse beam 19 carrying the plate 18, which serves to connect the trailer frame to the fifth wheel member of the tractor 20. Any suitable or preferred fifth wheel construction may, of course, be employed, although it is preferable that the structure of the fifth wheel mechanism allow for the detachable connection of the bearing plate 18 so that the trailer may, if desired, be detached from the tractor. In this connection, the trailer may be provided with folding legs or other suitable mechanism for supporting the forward end of the trailer when disconnected from the tractor.

The rearward portions of the frame 12 may be supported upon a pair of wheels 21, which are preferably connected to the frame 12 by dependent, preferably tubular wheel carrying members forming legs 22 on opposite sides of the frame. Each of these legs preferably comprises a member 23 fastened at or adjacent the rear end of the frame and extending downwardly and forwardly, said member 23 at its lower end having a preferably vertical axle mounting extension 24. Each leg also preferably comprises a tubular bracing member 25 extending between and fastened to the medial portions of a frame member 13 and the leg member 23 adjacent the extension 24, whereby said axle carrying extension is dependent beneath the frame member 13, on which it is attached, and is adequately braced by the leg members 23 and 25. The frame connected ends of the members 23 and 25 are preferably offset and connected to the outwardly facing sides of the members 13 so that the members 23 and 25 lie in a substantially vertical plane or zone outwardly of the outer faces of the members 13. The frame connected ends of the legs 17 also are preferably offset and connected to the frame at the outwardly facing surfaces of the members 13.

Each of the wheels 21 may be mounted on its corresponding mounting portion 24 in any suitable or preferred fashion. To this end, each wheel is preferably journaled for rotation on an axle member 26, which may extend toward, and in axial alinement with, the corresponding axle member of the opposite wheel; and the abutting ends of the axle members 26 may be secured together, preferably in detachable fashion, as by means of a suitable coupling 27. On the outwardly facing sides of the wheels 21, the axles 26 may be provided each with a journal member 28 for turnably receiving the dependent wheel mounting portion 19 of the corresponding wheel supporting leg 22. The wheels and their axles may thus be mounted on the frame 12 for rotational movement about the axes of the wheel mounting extensions 24. By disconnecting the coupling 27, both wheels 21 may be turned on their respective mountings 24 into position extending outwardly of the wheel carrying legs, on opposite sides of the trailer, to thereby leave unobstructed the space between the legs 22, thereby facilitating the loading and unloading of a boat or other object on the trailer in the space between said legs. After loading or unloading, the trailer may be conditioned for overland transit by returning the wheels to normal traveling position, in axial alinement inwardly of the legs 22, and by replacing the coupling 27 in order to hold the wheels in traveling alinement.

A boat or other object 29 to be carried may be supported on a carrying frame 30, which is mounted in and longitudinally slidable on the main frame 12. The carrying frame 30, to this end, may comprise a pair of spaced-apart longitudinally extending members 31. These members preferably comprise I-beams maintained in spaced relationship by transverse members 32 and 33, respectively, at the opposite ends of the frame, and a member 34 at the medial portions. These transverse bracing and spacing members 32, 33, and 34 may also comprise I-beams, or they may be of tubular or other form. The longitudinal members 31 extend in the channel members 13 of the main frame and are supported therein for longitudinal movement on rollers 35 (Fig. 9) mounted in spaced relationship along and in the lower portions of the members 13. The upper forward ends of the members 31 rollingly engage rollers 36 disposed in spaced relationship along the members 13 from the medial portions toward the forward ends thereof, in order to hold down the forward end of the carrying frame 30 when the same is in rearwardly projected position from the main frame 12.

The rollers 35 and 36 may be journaled at their outer ends in suitable bearings formed in the members 13, as shown more particularly in Fig. 9 of the drawings. The inner ends of the rollers 35 and 36 may be mounted in brackets 37, preferably removably attached on the channel members 13, to facilitate the mounting of the rollers in assembled position. Lateral guide rollers 38, for holding the frame 30 against lateral movement in the frame 12, may be provided at intervals along the members 13, such rollers being mounted in suitable brackets 39 mounted on the channel members 13 in position to rollingly engage the longitudinal members 31 of the carrying frame.

In order to load a boat or other object to be transported on the trailer, the trailer may be positioned in line with the object to be loaded, with the rear or wheeled end of the trailer straddling the medial portions of the object to be loaded. The trailer may be so positioned by first bodily turning the wheels 21 outwardly on their supports 24 a sufficient distance, and then backing the trailer into position over the boat or other object to be loaded. The carrier frame 30 may then be projected rearwardly with respect to the main frame 12, into position above the boat, whereupon the object to be loaded may be drawn upwardly and suspended on the frame 30. Thereafter, the carrier frame, together with the boat suspended thereon, may be retracted or drawn forwardly into the frame 12, and secured in place. Finally, the wheels may be rotated inwardly on their supports 24 and secured in traveling position. The unloading operation, of course, may be accomplished by reversing the foregoing procedure. In connection with loading and unloading operations, it should be noted that a boat usually will be supported in the trailer with its bow toward the front end of the trailer, although a boat could be carried in the trailer stern foremost, if desired. It is ordinarily desirable to provide a guard 40 at the forward end of the boat, the same comprising a suitable framework that may be temporarily mounted at the forward end of the object being carried, as by attaching the same on suitable brackets mounted on the boat. Means may be provided for temporarily latching the wheels in outwardly opened position during the interval when the trailer is moved over the boat into loading or away from unloading position, with its wheels 21 turned outwardly. Such latching means may comprise a pin (not shown) placeable in holes formed diametrically opposite each other in the journals 28 and wheel mounts 19 to prevent the journals from turning on the mounts.

Suspension means, preferably in the form of leaf springs 41, may be mounted at the rear end of the frame 30. To this end, the springs 41 may be shackled or otherwise secured, as by means of preferably U-bolts 42, upon a transverse frame member 43 (Figs. 7 and 8) mounted between the members 31 adjacent and inwardly of the cross member 33. The so mounted springs 41 have ends extending beneath and projecting rearwardly of the member 33, the extremities of said ends being formed as at 44 for engagement with bracket means 45 on the object to be carried.

The bracket means 45 may comprise a yoke, as shown in Fig. 11, in the form of a transverse beam adapted to overlie the boat and formed with lugs 46 for attachment to the supporting portions 44 of the springs, as by means of shackles. The yoke forming beam 45 may be anchored on the boat by means of inclined tension rods 47 detachably secured to the boat, as by means of a U-bolt 48 pinned to a perforated lug 49 mounted on the keel of the boat. The opposite end of the boat, as shown in Fig. 10 of the drawings, may be provided with a lug 51 detachably pinned to a bracket 52 having a portion 53 for receiving a lifting hook 54. The forward portions of the frame 30, as in the cross member 32, may be provided with depending lugs 55 for receiving the bracket 52 therebetween, said bracket and lugs being perforated for the reception of a removable mounting pin 56 whereby to support the forward portions of the boat on the frame 30, the rearward portions of the boat being mounted on the springs 41.

In order to lift the boat into carrying position the frame 30 may be provided with power multiplying means of any suitable or preferred character. As shown, the frame 30 is provided with pulleys 57 and 58, respectively mounted in bearing brackets at the medial portions of the cross members 32 and 33, hoisting ropes 59 and 60 being provided respectively on the pulleys 57 and 58. The ends of said ropes may carry the hooks 54 for engagement with the bracket 53 and a bracket 61 (Fig. 6) on the beam 45. The hoisting ropes 59 and 60 may be operatively connected with suitable winding mechanism on the frames 12 or 30, or on the tractor 20. Such winding mechanism may be either power or manually operated. Where winding mechanism on the tractor 20 is employed, guide pulleys 62 may be provided as at the medial portions of the cross member 14, at the forward end of the main frame 12, for the purpose of guiding the hoisting ropes 59 and 60.

Means, which may be power operated or manually operable, if desired, is provided for projecting and retracting the frame 30 on the frame 12. Any suitable, convenient or preferred mechanism may be used for the purpose. Preferably, however, such means may comprise a rope or cable 63 (Fig. 4) traveling on pulleys, including a pulley 64 on the frame 12 near its medial portions and a pulley 65 at the forward end of the frame 12 (Fig. 3). The rope 63 has end portions connected on bracket means 66 on the frame 30, as on the cross member 32. By winding the rope 63 selectively in opposite directions as by a suitable hand or power operated winch, on the tractor 20 or on either of the frames 12 and 30, the frame 30 may be either projected rearwardly to loading and unloading position or retracted forwardly on the frame into carrying position. If desired, suitable latching mechanism may be provided for securing the frame in carrying position and also in loading and unloading position. Such latch means may conveniently comprise pin members adapted for application in openings formed through the side members 13 and 31 of the main and carrying frames.

The coupling device 18, at the forward end of the frame 12, may be of any suitable or preferred form to enable the trailer to be secured to a cooperating coupling structure on the tractor. Trailer supporting means, of any suitable or preferred character, also may be and preferably is provided for supporting the forward end of the trailer when the same is disconnected from the tractor. Such support means may comprise extensible leg means 66ª pivoted on the forward portions of the main frame 12, preferably on the ends of the I-beam 19 whereby such leg means may be disposed in extended position to support the front end of the frame at a suitable elevation to facilitate connection or disconnection of the coupling member 18 with the tractor. The leg means 66ª may have screw threaded extension means 67 to adjust the length thereof. When not in use, the supporting leg may be swung on its pivot to an inoperative position suspended on the frame 12, as against a leg member 17 thereof, suitable fastening means being provided for supporting the leg in inoperative position.

It will be seen from the foregoing that the invention provides a strong and rigid carrier particularly for boats and other elongated objects of substantial mass, the carrier being adapted to be drawn overland by suitable tractor means. The carriage is provided with means facilitating the attachment of the object to be carried. The carrier is also provided with readily operable power multiplying hoisting means for lifting the other end of the object, to be carried, into carrying position. The novel arrangement whereby the wheels are mounted on the carrier in position allowing the same to be opened outwardly to enable a transportable object to be loaded, allows the carrier to have minimum overall carrying width compatible with the maximum width of the object to be carried.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A carrier embodying a main wheel supported frame, towing means at an end of said frame, a carrying frame supported on said main frame and projectable thereon from a retracted carrying position to an extended loading and unloading position, hoisting means on said carrying frame and operable when the same is in extended position to raise or lower a transportable object to or from carrying position on the carrying frame, and suspension means on said carrier frame, separate from said hoisting means, and to which suspension means the object on the carrying frame is attached to be supported thereby.

2. A carrier embodying a main frame, towing means at an end of said frame, a carrying frame supported on said main frame and projectable thereon from a retracted carrying position to an extended loading and discharging position, hoisting means on said carrying frame and operable when the same is in extended position to raise or lower a transportable object to or from carrying position on the carrying frame, and suspension means on said carrying frame, separate from said hoisting means, said suspension means spaced apart on opposite sides of the medial portions of said carrying frame and to which remote portions of said transportable object are detachably connected.

3. A carrier embodying a main frame, towing means at an end of said frame, a carrying frame supported on said main frame and projectable thereon from a retracted carrying position to an extended loading and discharging position, hoisting means on said carrying frame and operable when the same is in extended position to raise or lower a transportable object to or from carrying position on the carrying frame, spring means on said carrying frame, toward an end thereof, for suspending the end portions of said transportable object resiliently on said carrying frame, and suspension means, other than said hoisting means, on and toward the other end of said carrying frame for suspending the other end portions of said object.

4. A carrier embodying a main frame, towing means at an end of said frame, a carrying frame supported on said main frame and projectable thereon from a retracted carrying position to an extended loading and discharging position, hoisting means on said carrying frame and operable when the same is in extended position to raise or lower a transportable object to or from carrying position on the carrying frame, suspension means other than said hoisting means, for supporting said transportable object on the carrying frame, said hoisting means comprising guides on said carrying frame adjacent the opposite ends thereof, hoisting ropes on said guides and connectible with said object, and winding mechanism for shifting said ropes to raise or lower the object on the frame.

5. A carrier embodying a main frame, towing means at an end of said frame, a carrying frame supported on said main frame and projectable thereon from a retracted carrying position to an extended loading and discharging position, hoisting means on said carrying frame and operable when the same is in extended position to raise or lower a transportable object to or from carrying position on the carrying frame, suspension means other than said hoisting means, for supporting said transportable object on the carrying frame, and means to secure the carrying frame on the main frame in said retracted and extended positions.

6. A carrier embodying a main frame, towing means at an end of said frame, a carrying frame supported on said main frame and projectable thereon from a retracted carrying position to an extended loading and discharging position, hoisting means on said carrying frame and operable when the same is in extended position to raise or lower a transportable object to or from carrying position on the carrying frame, suspension means other than said hoisting means, for supporting said transportable object on the carrying frame, and power multiplying means for moving said carrying frame to and from projected and retracted position on the main frame.

7. A carrier embodying a main frame, towing means at an end of said frame, a carrying frame supported on said main frame and projectable thereon from a retracted carrying position to an extended loading and discharging position, hoisting means on said carrying frame and operable when the same is in extended position to raise or lower a transportable object to or from carrying position on the carrying frame, suspension means other than said hoisting means, for supporting said transportable object on the carrying frame, said main frame comprising a pair of longitudinal channel members, and transverse bracing means interconnecting the channel members between the ends thereof, said carrying frame including transversely braced longitudinal members supported on and movable longitudinally of said longitudinal channel members of the main frame.

8. A carrier embodying a main frame, towing means at an end of said frame, a carrying frame supported on said main frame and projectable thereon from a retracted carrying position to an extended loading and discharging position, hoisting means on said carrying frame and operable when the same is in extended position to raise or lower a transportable object to or from carrying position on the carrying frame, suspension means other than said hoisting means, for supporting said transportable object on the carrying frame, said main frame comprising a pair of longitudinal channel members, transverse bracing means interconnecting the channel members between the ends thereof, said carrying frame including transversely braced longitudinal members supported on and movable longitudinally of said longitudinal channel members of the main frame, and roller means on said channel members in position to rollingly support the longitudinal members of said carrying frame.

9. A carrier comprising a main frame, towing means at an end of said frame, a carrying frame supported on said main frame and projectable thereon from a retracted carrying position to an extended loading and discharging position, hoisting means on said carrying frame and operable when the same is in extended position to raise or lower a transportable object to or from carrying position on the carrying frame, suspension means for supporting said transportable object on the carrying frame, said main frame having dependent wheel carrying legs on opposite sides thereof remote from said towing means, a wheel carrying member on each leg, and a wheel on each wheel carrying member, said wheel supporting members being turnable on said legs to dispose said wheels selectively in normal traveling position inwardly of said legs and in position outwardly of said legs during loading and unloading of said transportable object.

10. A carrier comprising a main frame, towing means at an end of said frame, a carrying frame supported on said main frame and projectable thereon from a retracted carrying position to an extended loading and discharging position, hoisting means on said carrying frame and operable when the same is in extended position to raise or lower a transportable object to or from carrying position on the carrying frame, suspension means for supporting said transportable object on the carrying frame, said main frame having dependent wheel carrying legs on opposite sides thereof remote from said towing means, a wheel carrying member on each leg, a wheel on each wheel carrying member, said wheel supporting members being turnable on said legs to dispose said wheels selectively in normal traveling position inwardly of said legs and in position outwardly of said legs during loading and unloading of said transportable object, said wheels having axles adapted for alined abutting end-to-end relationship when in traveling position, and demountable clamp means securing the abutting ends of said axles in alinement.

FOSTER KRAKE.

REFERENCES CITED

The following references are of record in the file of this patent:

UNITED STATES PATENTS

| Number | Name | Date |
|---|---|---|
| 466,890 | Dean | Jan. 12, 1892 |
| 916,324 | Kastendike | Mar. 23, 1909 |
| 1,531,180 | Erickson | Mar. 24, 1925 |
| 1,745,045 | Romine | Jan. 28, 1930 |
| 1,975,636 | Fildes | Oct. 2, 1934 |
| 2,218,510 | Albertson | Oct. 22, 1940 |
| 2,240,564 | Le Tourneau | May 6, 1941 |
| 2,375,754 | Ballinger | May 15, 1945 |

FOREIGN PATENTS

| Number | Country | Date |
|---|---|---|
| 470,114 | Great Britain | Aug. 10, 1937 |
| 546,853 | France | Sept. 4, 1922 |